United States Patent
Kakeda et al.

(10) Patent No.: US 11,780,455 B2
(45) Date of Patent: Oct. 10, 2023

(54) VEHICLE CONTROL DEVICE, VEHICLE CONTROL METHOD, AND RECORDING MEDIUM

(71) Applicant: Honda Motor Co., Ltd., Tokyo (JP)

(72) Inventors: Takafumi Kakeda, Saitama (JP); Masashi Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/505,590

(22) Filed: Oct. 19, 2021

(65) Prior Publication Data

US 2022/0176983 A1 Jun. 9, 2022

(30) Foreign Application Priority Data

Dec. 3, 2020 (JP) ................................ 2020-200856

(51) Int. Cl.
*G08G 1/16* (2006.01)
*B60W 50/14* (2020.01)
(Continued)

(52) U.S. Cl.
CPC ............ *B60W 50/14* (2013.01); *B60W 40/04* (2013.01); *G06V 20/58* (2022.01); *G06V 20/588* (2022.01);
(Continued)

(58) Field of Classification Search
CPC ................ B60W 50/14; B60W 40/04; B60W 2050/0054; B60W 2050/143;
(Continued)

(56) References Cited

U.S. PATENT DOCUMENTS 10,553,117 B1 *  2/2020  Johnson ............ B60W 30/0956
2013/0135089 A1 *  5/2013  Sejalon .................. G08G 1/167
                                                              348/148
(Continued)

FOREIGN PATENT DOCUMENTS

JP          2006195641          7/2006
JP          5743286              7/2015
(Continued)

OTHER PUBLICATIONS

"Office Action of Japan Counterpart Application", dated Jul. 5, 2022, with English translation thereof, pp. 1-12.
(Continued)

*Primary Examiner* — Anh V La
(74) *Attorney, Agent, or Firm* — JCIPRNET

(57) ABSTRACT

This disclosure provides a vehicle control device, a vehicle control method, and a recording medium. The vehicle control device according to one aspect of an embodiment includes a recognition unit that recognizes an object in a periphery of the own vehicle, a road information acquisition unit that acquires road information in the periphery of the own vehicle, and an alarm control unit that causes an alarm device to give an alarm when the object recognized by the recognition unit exists in a predetermined region set with reference to a position of the own vehicle, in which the alarm control unit does not give the alarm regarding the object when at least part of the object existing in the predetermined (Continued)

region recognized by the recognition unit exists outside a road from a boundary the road where the own vehicle acquired by the road information acquisition unit exists.

12 Claims, 8 Drawing Sheets

(51) Int. Cl.
*B60W 40/04* (2006.01)
*G06V 20/58* (2022.01)
*G06V 20/56* (2022.01)
*B60W 50/00* (2006.01)

(52) U.S. Cl.
CPC ........... *B60W 2050/0054* (2013.01); *B60W 2050/143* (2013.01); *B60W 2050/146* (2013.01); *B60W 2552/53* (2020.02); *B60W 2554/801* (2020.02)

(58) Field of Classification Search
CPC ....... B60W 2050/146; B60W 2552/53; B60W 2554/801; B60W 30/08; B60W 40/06; B60W 2554/4041; G06V 20/58; G06V 20/588

USPC ................ 340/903, 435, 436, 425.5, 905
See application file for complete search history.

(56) References Cited

U.S. PATENT DOCUMENTS

| | | | |
|---|---|---|---|
| 2015/0054952 A1* | 2/2015 | Kim | G06V 20/588 |
| | | | 348/148 |
| 2018/0170327 A1 | 6/2018 | Lee et al. | |
| 2018/0181818 A1* | 6/2018 | Shimotani | G06T 7/70 |
| 2019/0193739 A1* | 6/2019 | Tokimasa | B60W 30/18163 |
| 2021/0031804 A1* | 2/2021 | Oyama | B60W 60/0025 |

FOREIGN PATENT DOCUMENTS

| | | |
|---|---|---|
| JP | 2017041132 | 2/2017 |
| JP | 2019213108 | 12/2019 |
| JP | 2020152222 | 9/2020 |
| WO | 2016084149 | 6/2016 |

OTHER PUBLICATIONS

Office Action of Japan Counterpart Application, with English translation thereof, dated Jan. 4, 2023, pp. 1-8.

* cited by examiner

VEHICLE CONTROL DEVICE, VEHICLE CONTROL METHOD, AND RECORDING MEDIUM

CROSS-REFERENCE TO RELATED APPLICATION

This application claims the priority benefits of Japanese application no. 2020-200856, filed on Dec. 3, 2020. The entry of the above-mentioned patent application is incorporated by reference herein and made a part of the specification.

BACKGROUND

Technical Field

The disclosure relates to a vehicle control device, a vehicle control method, and a recording medium.

Description of Selected Art

Conventionally, there is known a technique of detecting another vehicle (peripheral vehicle) existing in the periphery of the own vehicle, notifying information about the detected peripheral vehicle, and performing control according to the behavior of the peripheral vehicle. In this connection with this, a technique is known to detect an overtaking vehicle existing in an adjacent lane adjacent to the own lane on which the own vehicle travels, and to offset the own vehicle in a direction that separates the own vehicle from the detected overtaking vehicle (see, for example, Patent Literature 1). Further, in lane determination of adjacent lanes and the like, a technique is known to identify a lane to be traveled in, an adjacent lane, and a next adjacent lane based on a change in a white line included in an image taken by a camera mounted on a vehicle while driving in a curve (see, for example, Patent Literature 2).

RELATED ART

Patent Literature

[Patent Literature 1] Japanese Patent No. 5743286
[Patent Literature 2] Japanese Patent No. 2019-213108

However, when detecting a peripheral vehicle, even when objects such as peripheral vehicles that are unlikely to affect the traveling of the own vehicle or landmarks existing outside the road are detected, an alarm regarding the information about the object may be output. Therefore, it is not always possible to give appropriate alarms to the occupant of the own vehicle.

The disclosure has been made in consideration of such circumstances, and it is one of the objects to provide a vehicle control device, a vehicle control method, and a recording medium capable of more appropriately giving alarms to the occupant of the own vehicle regarding an object.

SUMMARY

The vehicle control device, the vehicle control method, and the recording medium according to the disclosure have adopted the following configurations.

(1): A vehicle control device according to one aspect of the disclosure includes a recognition unit that recognizes an object in a periphery of an own vehicle, a road information acquisition unit that acquires road information in the periphery of the own vehicle, and an alarm control unit that causes an alarm device to give an alarm when the object recognized by the recognition unit exists in a predetermined region set with reference to a position of the own vehicle, in which the alarm control unit does not give the alarm regarding the object when at least part of the object existing in the predetermined region recognized by the recognition unit exists outside a road from a boundary of the road where the own vehicle acquired by the road information acquisition unit exists.

(7): The vehicle control method according to one aspect of the disclosure includes a computer recognizing an object in a periphery of an own vehicle, acquiring road information in the periphery of the own vehicle, causing an alarm device to give an alarm when the object recognized exists in a predetermined region set with reference to a position of the own vehicle, and not causing the alarm regarding the object when at least part of the object existing in the predetermined region exists outside a road from a boundary of the road where the own vehicle exists.

(8): The recording medium according to one aspect of the disclosure includes causing a computer to recognize objects in a periphery of the own vehicle, acquire road information in the periphery of the own vehicle, cause an alarm device to give an alarm when the object recognized exists in a predetermined region set with reference to a position of the own vehicle, and not cause the alarm regarding the object when at least part of the object existing in the predetermined region exists outside a road from a boundary of a road where the own vehicle exists.

DESCRIPTION OF THE EMBODIMENTS

Hereinafter, embodiments of the vehicle control device, vehicle control method, and program of the disclosure will be described with reference to the drawings.

[Overall Structure]

Figure 1:
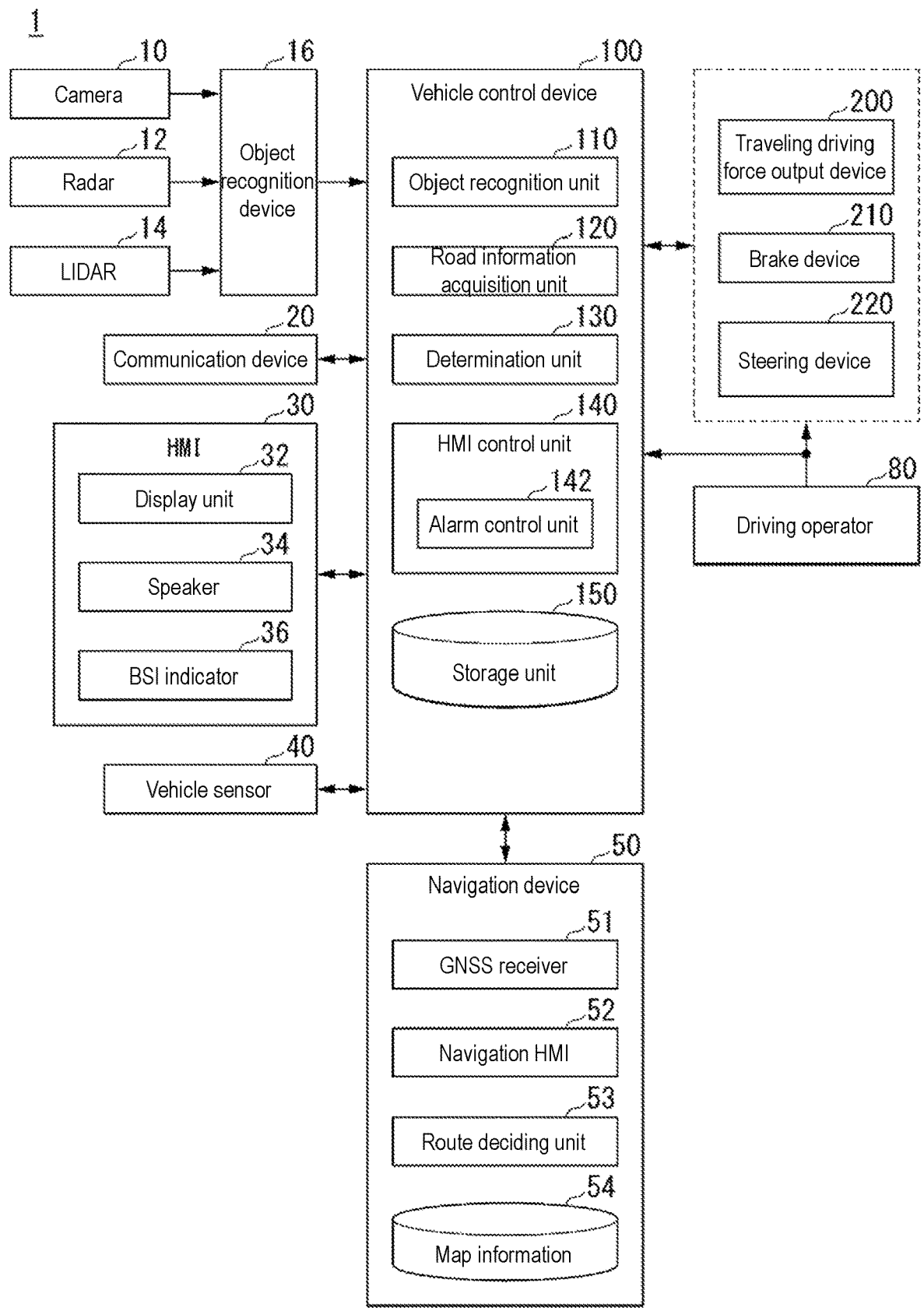
FIG. 1 is a configuration diagram of a vehicle system 1 including a vehicle control device of an embodiment.

FIG. 1 is a configuration diagram of a vehicle system 1 including a vehicle control device of an embodiment. A vehicle on which the vehicle system 1 is mounted (hereinafter referred to as "own vehicle M") is, for example, a vehicle such as a two-wheeled vehicle, a three-wheeled vehicle, or a four-wheeled vehicle, and the drive source thereof is an internal combustion engine such as a diesel engine or a gasoline engine, an electric motor, or a combination thereof. The electric motor operates by using a power generated by a generator connected to the internal combustion engine or a discharge power of a battery (storage battery) such as a secondary battery or a fuel cell.

The vehicle system 1 includes, for example, a camera (imaging unit) 10, a radar 12, a LIDAR (Light Detection and Ranking) 14, an object recognition device 16, a communication device 20, an HMI (Human Machine Interface) 30, a vehicle sensor 40, a navigation device 50, a driving operator 80, a vehicle control device 100, a traveling driving force output device 200, a brake device 210, and a steering device 220. These devices and machines are connected to each other by a multiplex communication line such as a CAN (Controller Area Network) communication line and the like, a serial communication line, a wireless communication network, or the like. The configuration shown in FIG. 1 is merely an example; a part of the configuration may be omitted and another configuration may be added.

The camera 10 is, for example, a digital camera using a solid-state image sensor such as a CCD (Charge Coupled Device), a CMOS (Complementary Metal Oxide Semiconductor), or the like. One or multiple cameras 10 are attached to any position of the own vehicle M. For example, when taking image of the front, the camera 10 is attached to the upper part of the front windshield, the back surface of the rearview mirror, or the like. When taking image of the rear, the camera 10 is attached to the upper part of the rear windshield, the back door, or the like. When taking image of the side, the camera 10 is attached to a door mirror or the like. The camera 10 periodically and repeatedly take images of the periphery of the own vehicle M, for example. The camera 10 may be a stereo camera.

The radar 12 radiates radio waves such as millimeter waves in the periphery of the own vehicle M, and detects radio waves (reflected waves) reflected by an object to detect at least the position (distance and orientation) of the object. One or multiple radars 12 are attached to any position of the own vehicle M. The radar 12 may detect the position and speed of the object by the FM-CW (Frequency Modified Continuous Wave).

The LIDAR 14 irradiates the periphery of the own vehicle M with light and measures the scattered light. The LIDAR 14 detects the distance to a target based on the time from light emission to light reception. The irradiated light is, for example, a pulsed laser beam. The LIDAR 14 is attached to an arbitrary position on the own vehicle M.

The object recognition device 16 performs sensor fusion processing on the detection results of a part or all of the camera 10, the radar 12, and the LIDAR 14, and recognizes the position, type, speed, and the like of objects in the periphery of the own vehicle M. The objects include, for example, peripheral vehicles (for example, peripheral vehicles existing within a predetermined distance from the own vehicle M), pedestrians, bicycles, road structures, and the like. The road structures include, for example, road signs, traffic lights, curbs, medians, guardrails, fences, walls, railroad crossings, and the like. Further, the road structures may include, for example, road markings such as a lane marker (hereinafter referred to as a lane marker) drawn or affixed to the road surface, a pedestrian crossing, a bicycle crossing zone, a temporary stop line, and the like. The object recognition device 16 may recognize a line type (for example, a solid line, a broken line, a double line, a color, etc.) when recognizing a lane marker. The object recognition device 16 outputs the recognition result to the vehicle control device 100. Moreover, the object recognition device 16 may output the detection results of the camera 10, the radar 12, and the LIDAR 14 to the vehicle control device 100 as they are. In that case, the object recognition device 16 may be omitted from the configuration of the vehicle system 1. Further, the object recognition device 16 may be included in the vehicle control device 100.

The communication device 20 uses, for example, a network such as a cellular network, a Wi-Fi network, a Bluetooth (registered trademark), a DSRC (Dedicated Short Range Communication), a LAN (Local Area Network), a WAN (Wide Area Network), an Internet, of the like, and, communicates with a peripheral vehicle existing in the periphery of the own vehicle M, a terminal device of a user who uses the own vehicle M, or various server devices, for example.

The HMI 30 presents various information to the occupant of the own vehicle M and receives input operations by the occupant. The HMI 30 includes, for example, a display unit 32, a speaker 34, and a BSI (Blind Spot Information) indicator 36. Moreover, the HMI 30 may include a buzzer, a touch panel, a switch, a key, a microphone and the like.

Figure 2:
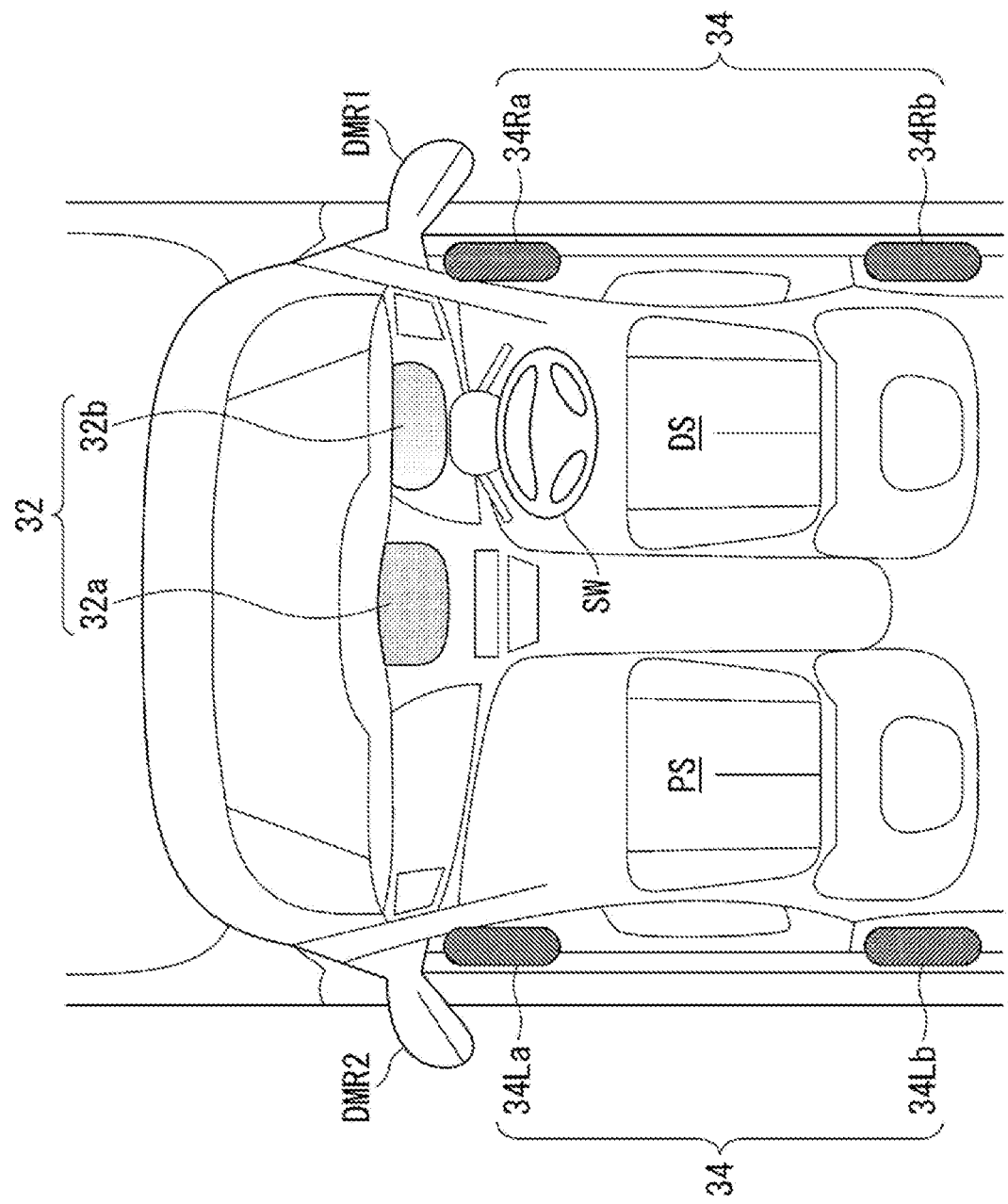
FIG. 2 is a schematic diagram showing a state of a vehicle interior when an own vehicle M is viewed from above.

FIG. 2 is a schematic diagram showing a state of a vehicle interior when the own vehicle M is viewed from above. As shown, for example, the display unit 32 is located under the front windshield and provided on the dashboard provided in front of a driver's seat DS and a passenger seat PS (a display unit 32*a* in the diagram). Further, the display unit 32 is, for example, provided near the front of the driver's seat DS (the seat closest to a steering wheel SW) (a display unit 32*b* in the diagram), and may be installed at a position visible to the occupant through the gap of the steering wheel SW or over the steering wheel SW.

The display unit 32 may be, for example, various display devices such as an LCD (Liquid Crystal Display), an organic EL (Electroluminescence) display, or the like. The display unit 32 displays images output by an HMI control unit 140. Moreover, the display unit 32 may be a touch panel that receives operations by the occupant on the screen. Further, the display unit 32*b* may function as an instrument panel (meter display) for displaying instruments such as a speedometer and a tachometer.

At least one speaker 34 is installed in the vehicle interior. The speaker 34 may be, for example, disposed near a door closest to the passenger seat PS (a speaker 34La in the diagram), near a door closest to the driver's seat DS (a speaker 34Ra in the diagram), near a door closest to a rear seat behind the passenger seat PS (a speaker 34Lb in the diagram), and near a door closest to a rear seat behind the driver's seat DS (speaker 34Rb in the diagram). The speaker 34 outputs a voice, a warning sound, or the like under the control of the HMI control unit 140, for example.

The BSI indicator 36 displays a predetermined image 36*a* on a part of a mirror surface of a door mirror of the own vehicle M, for example. The door mirrors are provided, for example, on the door closest to the driver's seat DS and the door closest to the passenger seat PS (a door mirror DMR1 and a door mirror DMR2 in the diagram). The image 36*a* is, for example, an image for notifying the occupant that an object exists in a predetermined region with reference to the own vehicle M.

Figure 3:
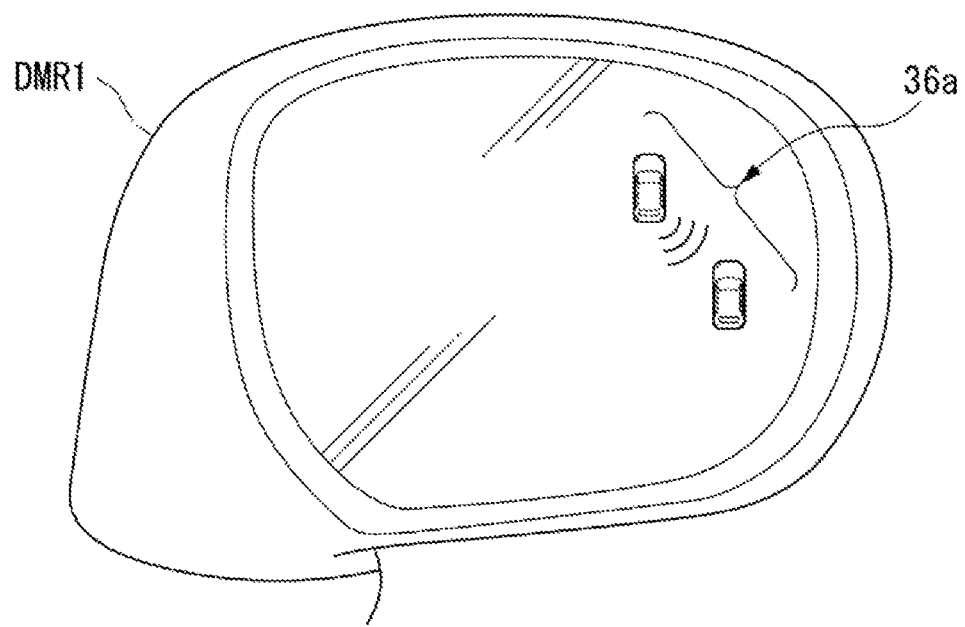
FIG. 3 is a diagram showing an example of an image displayed on a door mirror DMR1.

FIG. 3 is a diagram showing an example of an image displayed on the door mirror DMR1. As shown in the example, an image 36*a* showing that an object (for example, a peripheral vehicle) exists in a predetermined region with reference to the own vehicle M is displayed on a part of the mirror surface of the door mirror DMR1. The image 36*a* is also displayed on the door mirror DMR2. The image 36*a* may be displayed on the display unit 32 (for example, a meter display) instead of (or in addition to) being displayed on the door mirrors DMR1 and DMR2.

The vehicle sensor 40 includes a vehicle speed sensor that detects the speed of the own vehicle M, an acceleration sensor that detects the acceleration, a yaw rate sensor that detects the yaw rate (for example, a rotational angular speed around a vertical axis passing through the a of gravity of the own vehicle M), and an orientation sensor that detects the direction of the own vehicle M, and the like. Moreover, the vehicle sensor 40 may include a position sensor that detects a position of the own vehicle M. The position sensor is, for example, a sensor that acquires position information (longitude/latitude information) from a GPS (Global Positioning System) device. Further, the position sensor may be a sensor that acquires position information by using a GNSS (Global Navigation Satellite System) receiver 51 of the navigation device 50. The result detected by the vehicle sensor 40 is output to the vehicle control device 100.

The navigation device 50 includes, for example, the GNSS (Global Navigation Satellite System) receiver 51, a navigation HMI 52, and a route deciding unit 53, and holds map information 54 in a storage device such as an HDD (Hard Disk drive) or a flash memory. The GNSS receiver 51 identifies the position of the own vehicle M based on the signal received from the GNSS satellite. The position of the own vehicle M may be specified or complemented by an INS (Inertial Navigation System) using the output of the vehicle sensor 40. The navigation HMI 52 includes a display device, a speaker, a touch panel, a key, and the like. The navigation HMI 52 may be partially or wholly shared with the HMI 30. The route deciding unit 53 decides, for example, a route from the position of the own vehicle M (or any position input) specified by the GNSS receiver 51 to the destination input by the occupant using the navigation HMI 52 (for example, including information on waypoints when traveling to the destination) with reference to the map information 54.

The map information 54 is, for example, information in which a road shape is expressed by a link indicating a road and nodes connected by the link. Moreover, the map information 54 includes, for example, information on the center of the lane, information on the boundary of the lane, and the like. Further, the map information 54 may include road information, traffic regulation information, address information (address/zip code), facility information, telephone number information, and the like. The road information includes information indicating the type of road such as highways, toll roads, national roads, and prefectural roads, as well as the reference speed of roads, the number of lanes, the width of each lane, the slope of the road, the position of the road (three-dimensional coordinates including longitudinal, latitude, and height), the curvature of the curve of the road or each lane of the road, the position of the merging and branching points of the lanes, the signs provided on the road, and the like. The reference speed is, for example, the legal speed, the average speed of multiple vehicles that have traveled on the road in the past, and the like. The navigation device 50 provides route guidance using the navigation HMI 52 based on the route decided by the route deciding unit 53.

Moreover, the map information 54 may include, for example, information such as the number of lanes on the road, the radius of curvature (or curvature) of the road, the width, and the slope. Further, the map information 54 may include, for example, information on the type and position of the road structure, and the direction, size, shape, and color, and the like with reference to the extending direction of the road as information on the road structure. For the type of road structure, for example, the lane marker may be one type, or the marking line, the curb, the median strip belonging to the lane marker and the like may be different types. Further, the type of the lane marker may include, for example, a lane marker indicating that lane change is possible and a lane marker indicating that the lane change is not possible. The type of the lane marker may be set for each section of the road or lane based on the link, for example, or multiple types may be set in one link.

Moreover, the map information 54 may store information for distinguishing between the inside (in the road) and the outside (out of the road) of the road, and information regarding a region outside the road such as grass and gravel. Further, the map information 54 may be updated at any time by the communication device 20 communicating with the external device. The map information 54 may be stored in a storage unit 150.

The driving operator 80 includes, for example, various operators such as a steering wheel for an occupant to steer, an accelerator pedal, a brake pedal, a blinker lever for operating a blinker (direction indicator), and a shift lever. For example, an operation detection unit for detecting an operation amount of an operation by an occupant is attached to each operator of the driving operator 80. The operation detection unit detects the position of the blinker lever, the amount of depression of the accelerator pedal and the brake pedal, the position of the shift lever, the steering angle of the steering wheel, the steering torque, and the like. Then, the operation detection unit outputs a detection signal indicating the detection result to one or both of the vehicle control device 100, or/and the traveling driving force output device 200, the brake device 210, and the steering device 220.

The traveling driving force output device 200, the brake device 210, and the steering device 220 will be described prior to the description of the vehicle control device 100. The traveling driving force output device 200 outputs a traveling driving force (torque) for the own vehicle M to travel to the drive wheels. The traveling driving force output device 200 includes, for example, a combination of an internal combustion engine, an electric motor, a transmission, and the like, and a power ECU (Electronic Control Unit) that controls them. The power ECU controls the above configuration according to the information input from the vehicle control device 100 or the information input from the driving operator 80.

The brake device 210 includes, for example, a brake caliper, a cylinder that transmits flood pressure to the brake caliper, an electric motor that generates flood pressure in the cylinder, and a brake ECU. The brake ECU controls the electric motor according to the information input from the vehicle control device 100 or the information input from the driving operator 80 such that the brake torque corresponding to the braking operation is output to each wheel. The brake device 210 may include, as a backup, a mechanism for transmitting the oil pressure generated by the operation of the brake pedal included in the driving operator 80 to the cylinder via the master cylinder. The brake device 210 is not limited to the configuration described above, and may be an electronically controlled hydraulic brake device that controls an actuator according to information input from the vehicle control device 100 to transmit the oil pressure of the master cylinder to the cylinder.

The steering device 220 includes, for example, a steering ECU and an electric motor. The electric motor, for example, applies a force to the rack and pinion mechanism to change the direction of the steering wheel. The steering ECU drives the electric motor according to the information input from the vehicle control device 100 or the information input from the driving operator 80 to change the direction of the steering wheel.

[Configuration of Vehicle Control Device]

The vehicle control device 100 includes, for example, an object recognition unit 110, a road information acquisition unit 120, a determination unit 130, the HMI control unit 140, and the storage unit 150. The object recognition unit 110, the road information acquisition unit 120, the determination unit 130, and the HMI control unit 140 are each realized by executing a program (software) by a hardware processor such as a CPU (Central Processing Unit). Moreover, some or all of these components may be realized a hardware such as by LSI (Large Scale Integration), ASIC (Application Specific Integrated Circuit), FPGA (Field-Programmable Gate Array), GPU (Graphics) or by the cooperation of software and hardware. The above-mentioned program may be stored in advance in a storage device (a storage device including a non-transient storage medium) such as an HDD or a flash memory of the vehicle control device 100 or in a detachable storage medium such as a DVD, a CD-ROM, a memory card, or the like, and may be installed in the storage device of the vehicle control device 100 by mounting the storage medium in a drive device, a card slot, or the like. The object recognition unit 110 is an example of a "recognition unit". The HMI 30 is an example of an "alarm device".

The storage unit 150 may be realized by the above-mentioned various storage devices, EEPROM (Electrically Erasable Programmable Read Only Memory), ROM (Read Only Memory), RAM (Random Access Memory), or the like. The storage unit 150 stores, for example, information necessary for executing the alarm control in the present embodiment (for example, a determination result of an object for each cycle), various other information, a program, and the like. Further, the above-mentioned map information 54 may be stored in the storage unit 150.

The object recognition unit 110 recognizes an object existing in the periphery of the own vehicle M based on the information input from the camera 10, the radar 12, and the LIDAR 14 via the object recognition device 16. The periphery of the own vehicle M is, for example, a region within a predetermined distance from a reference point of the own vehicle M (for example, the center or the center of gravity of the own vehicle M). Moreover, the periphery of the own vehicle M may be set according to the detectable range of the camera 10, the radar 12, and the LIDAR 14. Further, the target includes, for example, peripheral vehicles, curbs, guardrails, electric currents, road signs, and the like.

In addition, the object recognition unit 110 acquires the position, shape, size, region, and the like of the object. Moreover, the object recognition unit 110 recognizes states such as the position, speed, and acceleration of the peripheral vehicle when the object is a peripheral vehicle. The position of the peripheral vehicle may be represented by a representative point such as the center of gravity or a corner of the peripheral vehicle, or may be represented by a region represented by the outline of the peripheral vehicle. The "state" of the peripheral vehicle may include the acceleration or jerk of the peripheral vehicle, or the "behavioral state" (e.g. whether or not the vehicle is changing lanes or trying to accelerate).

The object recognition unit 110 may set the reliability for the recognized object. For example, the object recognition unit 110 increases the reliability of the object as the number of sensors capable of recognizing the object among the external sensors (for example, the camera 10, the radar 12, and the LIDAR 14) increases. Therefore, an object recognized by only a single sensor has a lower reliability than an object recognized by multiple sensors. The single sensor is, for example, any one of the camera 10, the radar 12, and the LIDAR 14.

Moreover, the object recognition unit 110 may recognize an object having a reliability equal to or lower than a threshold value (for example, an object detected only by a single sensor) as an uncertain object. Further, the object recognition unit 110 may recognize each of the objects in an identifiable manner, and recognize each object whose first recognized position is within a predetermined distance from the own vehicle M as an uncertain object. For example, guardrails, fences, or the like that are separated by predetermined distances are recognized as objects, and the first recognized position is a distance close to the own vehicle M, so these objects are recognized as uncertain objects.

The road information acquisition unit 120 acquires road information in the periphery of the own vehicle M based on the position information of the own vehicle M. For example, the road information acquisition unit 120 identifies the position of the own vehicle M based on the signal received from the GNSS satellite by the GNSS (Global Navigation Satellite System) receiver 51. The position of the own vehicle M may be specified or complemented by an INS (Inertial Navigation System) using the output of the vehicle sensor 40. Moreover, the road information acquisition unit 120 may refer to the map information 54 based on the position information of the own vehicle M and acquire the road information existing in the periphery of the own vehicle M. The road information includes, for example, position information of road boundaries and lane markers, and the presence/absence and type of road structures. The boundary is, for example, a mark other than a lane marker, and is a boundary that separates the inside and the outside of a road in which travel in the same direction is possible. The boundaries are separated by the location of road structures such as curbs, card rails, fences, signs, walls and blocks. Moreover, the boundaries may be separated by the edge of a region such as turf or gravel. Further, the road information acquisition unit 120 may access the external device in which the map information is stored via the communication device 20 based on the position information of the own vehicle M, and acquire the above-mentioned road information from the external device.

Further, the road information acquisition unit 120 may acquire road information based on the analysis result of the image captured by the camera 10 (hereinafter, camera image). In this case, the road information acquisition unit 120 acquires feature information such as edge region, color information, shape, and size as the analysis result of the camera image, and acquires position information such as the boundary and the lane marker from the acquired information. Moreover, the road information acquisition unit 120 may acquire the boundary of the road from the feature information of an object that is not included in the temporarily placed map information such as a block, an embankment, a construction site, or the like from the analysis result of the camera image.

Further, the road information acquisition unit 120 may acquire more accurate road information by integrating the road information acquired based on the map information 54 and the road information acquired based on the camera image. Moreover, the road information acquisition unit 120 may acquire the position of the own lane (the traveling lane of the own vehicle M) included in the road on which the own vehicle M exists and the position of the lane adjacent to the own lane (hereinafter, the adjacent lane) by using one or both of the map information 54 and the camera image. Moreover, the road information acquisition unit 120 may acquire the position of the next adjacent lane adjacent to the adjacent lane. Further, the road information acquisition unit 120 may acquire the position of the lane marker that distinguishes the lanes.

The determination unit 130 determines whether or not each object recognized by the object recognition unit 110 is an alarm target object (in other words, whether it is an object subject to alarm or an object not subject to alarm) based on the information about the object recognized by the object recognition unit 110 and the road information acquired by the road information acquisition unit 120. The target alarm object is, for example, an object existing in a predetermined region with reference to the own vehicle M. The predetermined region is, for example, a region that becomes a blind spot during driving of an occupant (for example, a driver). The predetermined region is, for example, a rear lateral side region of the own vehicle M (for example, a left side region and a right side region). Details of the function of the determination unit 130 will be described later.

The HMI control unit 140 notifies the occupant of predetermined information by the HMI 30. The predetermined information includes, for example, information related to the traveling of the own vehicle M. The information regarding the traveling of the own vehicle M includes, for example, the speed of the own vehicle M, the engine speed, the shift position, and the like. Moreover, the predetermined information may include, for example, information on the current position and destination of the own vehicle M and the remaining amount of fuel. Further, the predetermined information may include information that is not related to the travel of the own vehicle M, such as contents (for example, a movie) stored in a storage medium such as a television program or a DVD.

The HMI control unit 140 includes, for example, an alarm control unit 142. When the determination unit 130 determines that the alarm target object exists, the alarm control unit 142 displays the image 36a on the door mirrors DMR1, DMR2, or the like of the own vehicle M by the BSI indicator 36, and notifies the existence of the object on the occupant, or the like. Further, instead of (or in addition to) displaying the image 36a by the BSI indicator 36, the alarm control unit 142 may output a sound such as an alarm from the speaker 34, or may operate a vibration sensor (not shown) provided in the steering wheel SW or a vibration sensor (not shown) provided in the driver's seat DS to give an alarm to the occupant (driver) by vibration.

For example, the HMI control unit 140 may generate an image containing the predetermined information described above, display the generated image on the display unit 32 of the HMI 30, generate a voice indicating the predetermined information, and output the generated sound from the speaker 34 of the HMI 30. Moreover, the HMI control unit 140 may output the information received by the HMI 30 to the communication device 20, the navigation device 50, and the like. Further, the HMI control unit 140 may transmit various information to be output to the HMI 30 to the terminal device used by the user (occupant) of the own vehicle M via the communication device 20. The terminal device is, for example, a smartphone or a tablet terminal.

[Function of Determination Unit]

Next, the function of the determination unit 130 will be specifically described. The determination unit 130 executes, for example, the first to fifth determination processes shown below. Either of the fourth and fifth determination processes is executed based on the result of the third determination process. The series of determination processes is repeatedly executed at a predetermined timing or at a fixed cycle. The determination unit 130 stores the determination result in the storage unit 150 or the internal memory for each cycle. The storage unit 150 or the internal memory stores the determination results for a predetermined cycle (for example, about 10 to 100 cycles).

<First Determination Process>

The first determination process determines, for example, that an object is not an alarm target object when at least part of the object existing in a predetermined region with reference to the own vehicle M exists outside a road from a boundary of the road where the own vehicle M exists.

Figure 4:
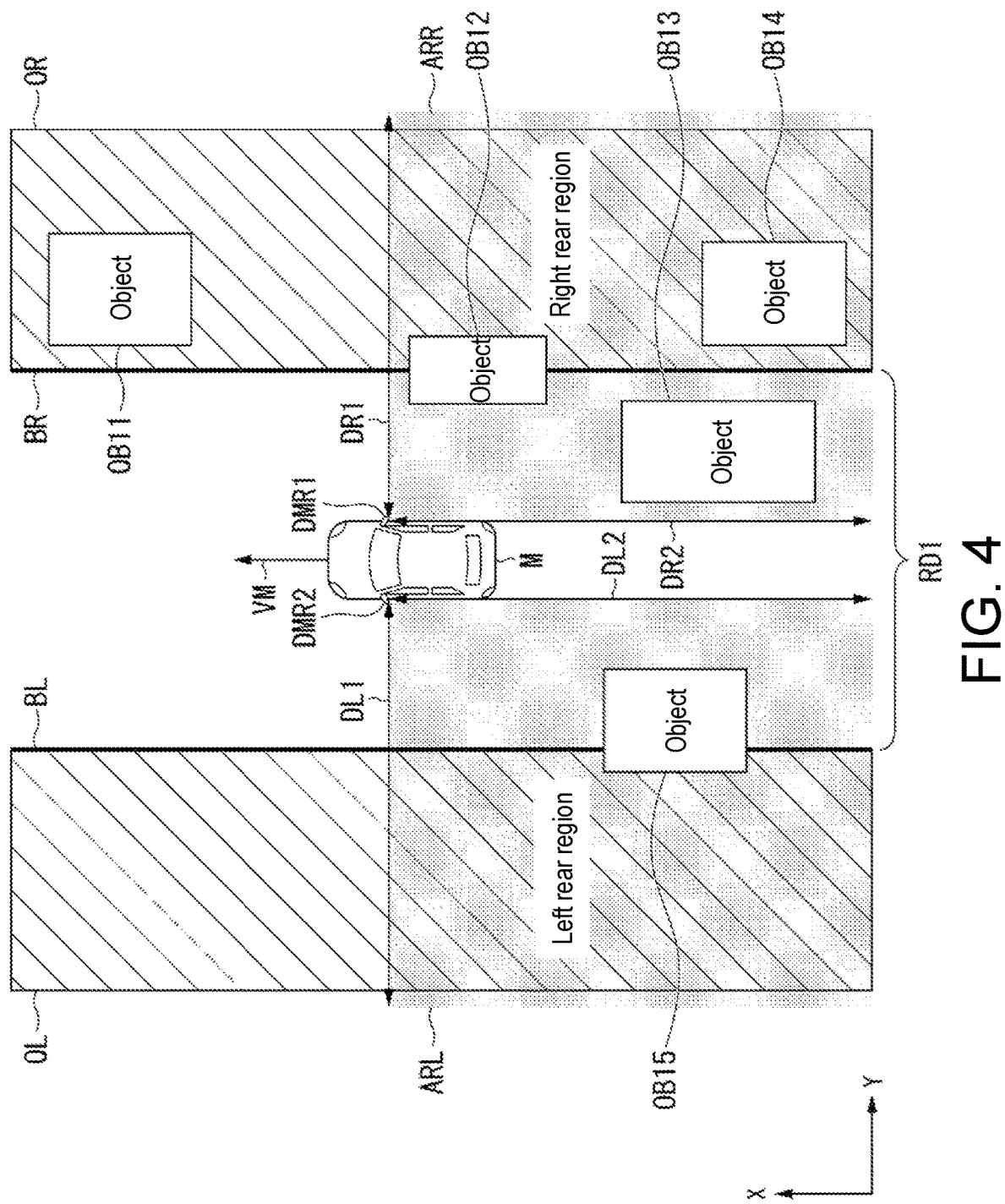
FIG. 4 is a diagram illustrating a first determination process of a determination unit 130.

FIG. 4 is a diagram illustrating the first determination process of the determination unit 130. In the example of FIG. 4, it is assumed that the own vehicle M is traveling in the direction possible for traveling of a road RD1 (X-axis direction in the diagram) at a speed VM. Moreover, in the example of FIG. 4, the road RD1 is separated from outer regions OR and OL of the road by road boundaries BR and BL.

Further, in the example of FIG. 4, a left rear region ARL and a right rear region ARR (regions at rear lateral side) are set as predetermined regions with reference to the predetermined positions of the own vehicle M. In the example of FIG. 4, the left rear region ARL is a region having a predetermined length DL1 from the position of the door mirror DMR2 on the left side of the own vehicle M toward the left with reference to the traveling direction of the own vehicle M and a predetermined length DL2 from the position of the door mirror DMR2 toward the rear of the own vehicle M. The right rear region ARR is, for example, a region having a predetermined length DR1 from the position of the door mirror DMR1 on the right side of the own vehicle M toward the right with reference to the traveling direction of the own vehicle M and a predetermined length DR2 from the position of the door mirror DMR1 toward the rear of the own vehicle M. The predetermined regions ARL and ARR may be different depending on, for example, the installation position and performance of the camera 10, the radar 12, and the LIDAR 14 of each vehicle. Moreover, the reference position of the own vehicle M may be a position other than the door mirrors DMR1 and DMR2 (for example, the center, the center of gravity, the side end, and the rear end of the own vehicle M). Further, the left and right front regions may be included as a predetermined region with reference to the predetermined position of the own vehicle M.

In the example of FIG. 4, the object recognition unit 110 recognizes objects OB11 to OB15 existing in the periphery of the own vehicle M based on the detection results of, for example, a part or all of the camera 10, the radar 12, and the LIDAR 14. The road information acquisition unit 120 acquires the boundaries BR and BL between the road RD1 (road region) and the outer regions OR and OL, for example, based on the detection result by the camera 10 or the like. Further, the road information acquisition unit 120 may acquire the boundaries BR and BL of the road where the own vehicle M exists by referring to the map information 54 based on the position information of the own vehicle M.

First, the determination unit 130 determines whether or not an object included in the left rear region ARL or the right rear region ARR exists among the objects recognized by the object recognition unit 110. In the example of FIG. 4, the determination unit 130 determines that the objects OB12 to OB15 are included in the left rear region ARL or the right rear region ARR. Next, the determination unit 130 determines whether or not at least one of the objects OB12 to OB15 exists outside the road RD1 from the boundary BR or BL acquired by the road information acquisition unit 120. When at least part of the object is outside the road RD1 from the boundary BR or BL, the determination unit 130 determines that the object is an obstacle (for example, a guardrail, a fence, a wall, etc.) that is not an alarm target object (giving no alarm). Further, when none of the part of the object is outside the road RD1 (when the whole object exists inside the road RD1), the determination unit 130 performs the second determination process described later.

In the example of FIG. 4, among the objects OB12 to OB15 included in the left rear region ARL or the right rear region ARR, the determination unit 130 determines that the objects OB12, OB14, and OB15 are not alarm targets, and determines that the object OB13 is an alarm object.

In the first determination process, by treating an object having a least part thereof existing outside the road RD1 from the boundaries BR and BL among the objects existing in the predetermined region (the right rear region ARR, the left rear region ARL) as not an alarm target, objects such as guard rails, fences, and walls existing on or outside the boundary may be excluded from being the alarm target object. Further, by performing the first determination process, for example, even when the lane marker in the road cannot be recognized (or acquired), the obstacle outside the road may be excluded from being the alarm target. Therefore, it is possible to perform more appropriate alarm control.

<Second Determination Process>

Next, the second determination process of the determination unit 130 will be described. The second determination process determines whether or not each object determined as an alarm target in the first determination process is an uncertain object. In the second determination process, the determination unit 130 determines whether or not the object determined as an alarm object in the first determination process is a new object, or whether or not that the object recognized by the object recognition unit 110 was determined as an uncertain object in the previous cycle. The new object is, for example, an object first recognized by the object recognition unit 110 during the processing of the current cycle.

When it is determined that the object is a new object, or when the object recognized by the object recognition unit 110 was determined as an uncertain object in the previous cycle, the determination unit 130 determines whether or not the object is an uncertain object in this process based on the recognition result by the object recognition unit 110. When it is determined that the object is an uncertain object, the determination unit 130 determines whether or not the object is continuously recognized for a predetermined cycle (predetermined time) or longer based on the determination result stored in the storage unit 150 or the internal memory. The predetermined cycle is, for example, a period when the determination process by the determination unit 130 is executed multiple times in a fixed cycle. Further, the predetermined cycle may be rephrased as a predetermined time.

Moreover, for example, when it is determined that the object suddenly appears in the periphery of the own vehicle M or the reliability is low, the determination unit 130 determines that the object is an uncertain object. Further, the determination unit 130 does not confirm the object unless the object is continuously recognized for a predetermined cycle or longer. As a result, for example, among the new objects, objects that suddenly appear in the periphery of the own vehicle M (e.g. a wall, guardrail, etc.), roadside reflectors (e.g. a curve mirror or wall), objects that are recognized by a ghost phenomenon or the like transferred into the image captured by the camera 10 due to roadside reflection, objects with low reliability detected by a single sensor, and the like may be excluded from being an uncertain object. For example, when it is recognized that each of the multiple walls or guardrails branched along the road is a different object, each wall or guardrail is recognized as a new object, so it is an object suddenly appearing in the periphery of the own vehicle M. Moreover, an object detected only by a single sensor may be recognized as a different object even if it is the same object because it has low reliability. Therefore, by the second determination process, the alarm accuracy can be improved by making the object determined to be an uncertain object as described above an object that is not an alarm target.

Further, in the second determination process, when there is an object that has not been determined to be an uncertain object, the determination unit 130 performs a third determination process described later. For example, even if the previously recognized object was determined as an uncertain object, when the uncertainty condition is no longer satisfied due to the recognition reliability rising up above a threshold value in a next cycle, the determination unit 130 immediately confirms the object and performs the third determination process. According to the second determination process described above, it is possible to more accurately determine whether or not an object is an alarm target object by tracking an object having low reliability.

<Third Determination Process>

Next, the third determination process will be described. For example, the third determination process is executed when the recognized object was not a new object in second determination process and the object recognized by the object recognition unit 110 was determined as not an uncertain object in the previous cycle. Further, the third determination process may be executed when the object was determined as an uncertain object and when the object exists continuously for a predetermined cycle or longer in the second determination process. This is because even an uncertain object that exists in the blind spot region or the like continuously for a predetermined cycle or longer has a high possibility of affecting the driving of the occupant, and there is a high need for an alarm.

As a third determination process, the determination unit 130 determines whether or not the recognized object was determined as an obstacle in the determination of the determination unit 130 in the previous cycle. When the determination unit 130 determines that an object was determined as an obstacle in the previous cycle, the fourth determination process described later is performed, and when was is not determined as an obstacle, the fifth determination process described later is performed.

<Fourth Determination Process>

Figure 5:
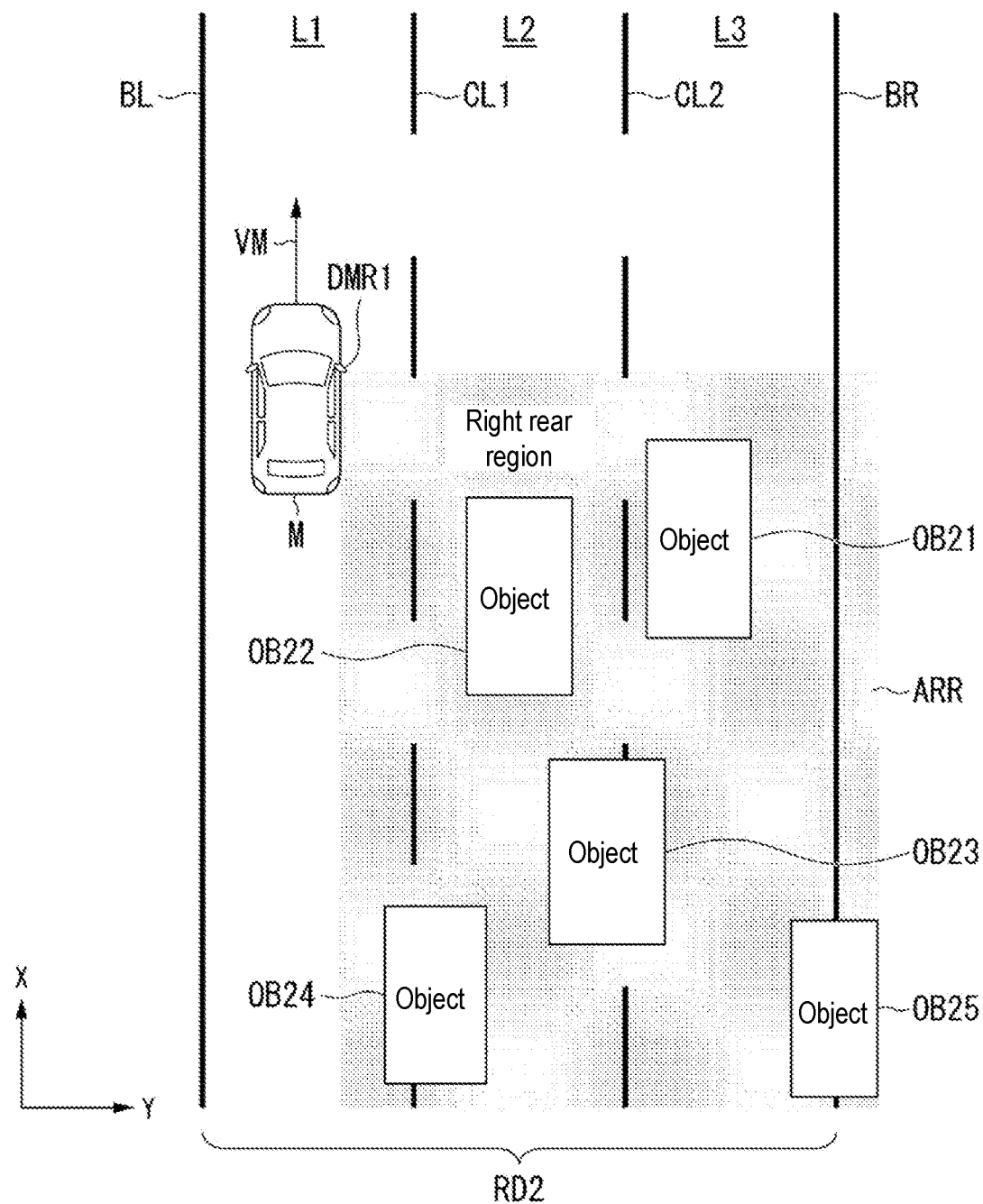
FIG. 5 is a diagram illustrating the fourth determination process of the determination unit 130.

FIG. 5 is a diagram illustrating a fourth determination process of the determination unit 130. In the example of FIG. 5, for convenience of explanation, the right rear region ARR will be mainly described, but the same processing is executed for the left rear region ARL. In the example of FIG. 5, a road RD2 including three lanes (L1 to L3) in which travel in the same direction is possible is shown. The road RD2 is divided by the boundaries BR and BL, a lane L1 is divided by the road boundary BL and a lane marker CL1, a lane L2 is divided by the lane marker CL1 and a land marker CL2, and a lane L3 is divided by the lane marker CL2 and the boundary BR. Further, it is assumed that the own vehicle M travels in the lane L1 at a speed VM. Hereinafter, in a situation where the own vehicle M travels in the lane L1, the lane L1 is referred to as the "own lane L1", the lane L2 is referred to as the "adjacent lane L2", and the lane L3 is referred to as the "next adjacent lane L3".

The object recognition unit 110 recognizes objects OB21 to OB25 existing in the right rear region ARR of the own vehicle M. The road information acquisition unit 120 recognizes the road boundaries BR and BL, and the lane markers CL1 and CL2 based on one or both of the camera image or the map information 54. Further, the road information acquisition unit 120 may acquire information on the line types (for example, solid line, broken line, double line, etc.) of the lane markers CL1 and CL2.

In the fourth determination process, the determination unit 130 determines that the object is a vehicle on the road and is an alarm target object when the object exists inside the road RD2 from the road boundaries BR and BL and at least part of the object exists in the adjacent lane L2. Further, in the fourth determination process, the determination unit 130 determines that the object is an obstacle and not an alarm target object when the object exists inside the road RD2 from the road boundaries BR and BL and none of the part of the object exists in the adjacent lane L2. In the example of FIG. 5, among the objects OB21 to OB25, the determination unit 130 determines that the objects OB22 to OB24 are alarm target objects, and determines that the objects OB21 and OB25 are not alarm target objects.

Further, in the fourth determination process described above, whether or not an object, among the objects existing at the rear lateral side, is an alarm target object is determined based on the lanes L2 and L3 on the road RD2, but alternatively (or in addition), it is possible that an object existing within a predetermined distance from the lane marker CL1, of the lane marker CL1 or the boundary BL that divides the own lane L1, that divides the own lane L1 and the adjacent lane L2 (dividing line at the side of the adjacent lane) can be determined as an alarm target object.

Figure 6:
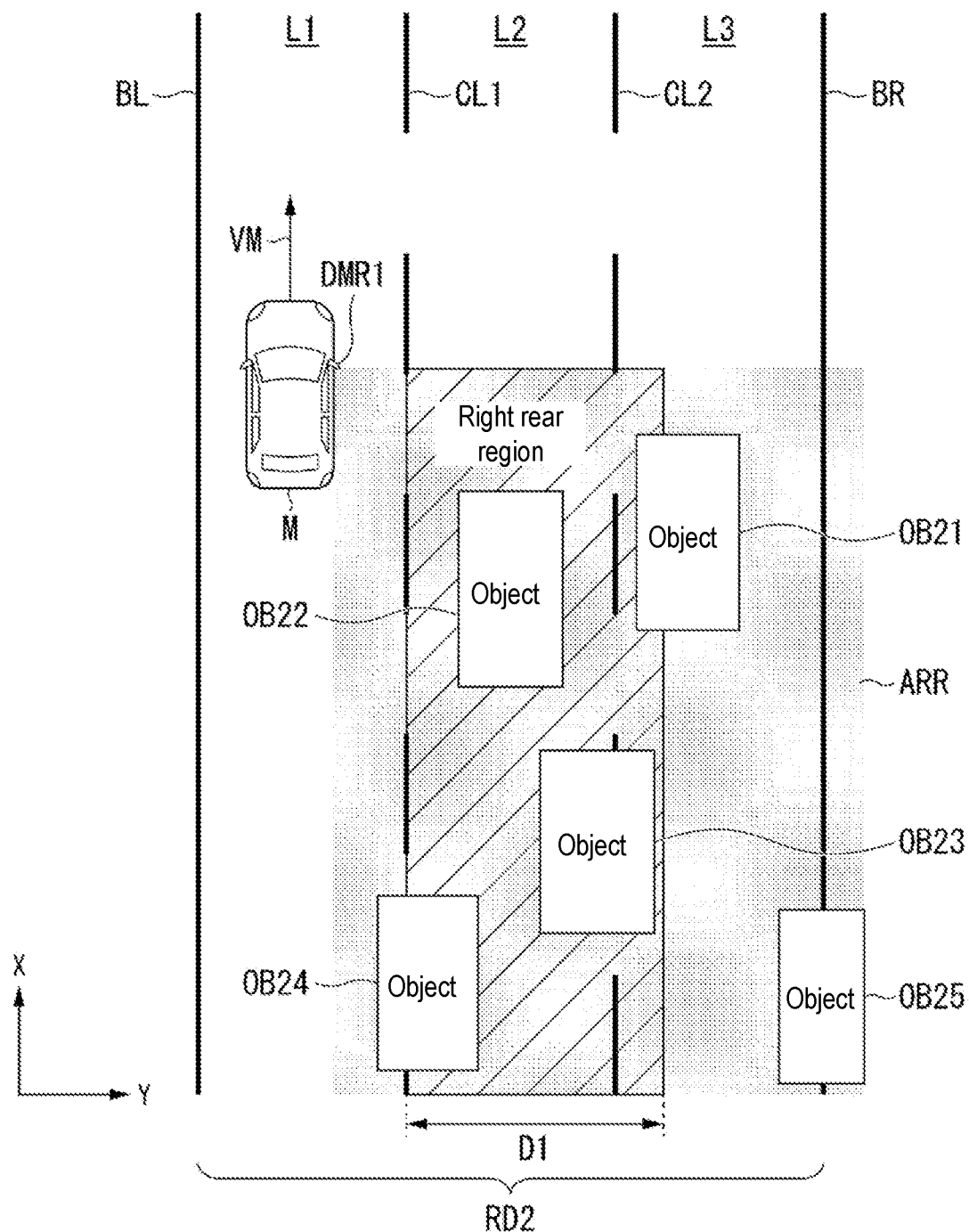
FIG. 6 is a diagram illustrating a process of determining whether or not an object is an alarm target object based on a distance from a lane marker.

FIG. 6 is a diagram illustrating a process of determining whether or not the object is an alarm target object based on a distance from a lane marker. In the example of FIG. 6, the traveling state of the own vehicle M under the same conditions as the example of FIG. 5 is shown. In the example of FIG. 6, the determination unit 130 determines that the object is an alarm target when the object is in the right rear region ARR and at least part of the object exists inside (on the side of lane marker CL1) from the position extended only by a predetermined distance D1 in the lateral direction of the lane (Y-axis direction in the diagram) from the lane marker CL1.

The predetermined distance D1 is set based on, for example, the width of the road RD1 or the width of the lane (L1 or L2). Further, the predetermined distance D1 may be set based on the road shape (for example, a curved road, a slope, etc.) or may be set based on the behavior of the own vehicle M (for example, speed or steering angle). Moreover, the predetermined distance D1 may be based on the center of the lane L1 or the boundary BL as a reference instead of using the lane marker CL1 as a reference. Further, the predetermined distance D1 may be a fixed value. By making a determination using the predetermined distance D1, a more appropriate determination may be made based on the road condition and the traveling state of the own vehicle M.

In the example of FIG. 6, the determination unit 130 determines that among the objects OB21 to OB25, the objects OB21 to OB24 are the alarm target objects. In this way, by making an object existing within a predetermined distance D1 as viewed from the own lane L1 an alarm target, for example, even when the lane on the road cannot be recognized, the alarm accuracy can be further improved by making a determination based on the lane marker information and the detection distance of the object. Moreover, even if the vehicle exists in the next adjacent lane L3, if the road width or the lane width is narrow, since there is a possibility of contact with the own vehicle M by a small change in behavior, even a peripheral vehicle existing in the next adjacent lane L3 can be determined as an alarm target, thus the alarm can be given more appropriately. When the width of the lane included in the road is larger than a threshold value, the determination unit 130 may make a determination based on the lane, and when it is equal to or less than the threshold value, make a determination based on the distance D1 from the lane marker CL1 described above.

<Fifth Determination Process>

Next, the fifth determination process will be described. In the fifth determination process, when the recognized object was not recognized as an obstacle in the previous cycle in the third determination process, whether or not the object is an alarm target is determined. In the fifth determination process, the determination unit 130 determines whether or not the recognized object exists outside the second lane marker when viewed from the own lane L1. When the object exists outside the second lane marker when viewed from the own lane L1, it is determined that the object is a peripheral vehicle traveling in the next adjacent lane L3 that is not an alarm target object. Further, the determination unit 130 determines that the object is an on-road vehicle that is an alarm target when it does not exist outside the second lane marker as seen from the own lane L1 (that is, at least part of the object exists in the adjacent lane L2).

For example, in the example of FIG. 5, when the fifth determination process is applied, among the objects OB21 to OB25, the determination unit 130 determines that the objects OB21 and OB25 are peripheral vehicles that are not alarm targets, and determines that the objects OB22 to OB24 are peripheral vehicles that are alarm targets. The object OB25 is determined by the first determination process to be an object that is not an alarm target.

[Function of Alarm Control Unit]

Next, the function of the alarm control unit 142 will be specifically described. When there is an object determined to be an alarm target by the determination unit 130, the alarm control unit 142 gives an alarm regarding the object and notifies the occupant that there is an object in a predetermined region (for example, a blind spot region). In this case, the alarm control unit 142 continuously executes the alarm as long as the above-mentioned determination conditions are met. Further, the alarm control unit 142 may vary the degree of alarm according to the distance between the own vehicle M and the object, the behavior of the own vehicle M, the behavior of the object, the alarm time, and the like.

For example, when there is an object at a distance or more from the own vehicle M, the alarm control unit 142 lights the BSI indicator 36 as an alarm control (first alarm control) when the alarm degree is the lowest. When there is an alarm target object on the right side, the alarm control unit 142 lights a predetermined image 36a on the right door mirror DMR1; and when there is an alarm target object on the left side, the alarm control unit 142 lights a predetermined image 36a on the left door mirror DMR2.

Further, when the alarm control unit 142 detects that the occupant intends to change the lane of the own vehicle M by operating the blinker lever or the like while the first alarm control is being executed, the alarm control unit 142 blinks the image 36a of the BSI indicator 36 and an alarm sound is output from the speaker 34 as a second alarm control having a higher alarm degree than the first alarm control. When the alarm sound is output from the speaker 34, the alarm control unit 142 may output the alarm sound from the speaker in the direction in which the alarm target object exists, or make the type and volume of the alarm sound different according to the relative distance between the own vehicle M and the object (e.g. a peripheral vehicle).

Further, when the occupant starts changing the lane of the own vehicle M while the second alarm control is being executed, the alarm control unit 142 blinks the image 36a of the BSI indicator 36 and outputs an alarm sound from the speaker 34 as a third alarm control having a higher alarm degree than the second alarm control; it may also perform driving support control by causing an image indicating the alarm on the display unit 32 or making the steering device 220 move to the original traveling lane without changing lanes so as to perform acceleration/deceleration to avoid contact with an approaching vehicle. In this way, by changing the degree of alarm according to the situation of the own vehicle M and the object for control, it is possible to perform more appropriate control such as alarm and driving support for the occupant of the own vehicle M.

When there are multiple alarm targets, the alarm control unit 142 may set the above-mentioned alarm degree with reference to the object closest to the own vehicle M, and perform alarm control based on the set alarm degree. Further, instead of (or in addition to) the alarm control described above, the alarm control unit 142 may give an alarm to the occupant (especially the driver) by vibrating a vibration sensor (not shown) provided on the steering wheel or the vibration sensor (not shown) provided on the driver's seat DS, or by displaying feature information on the display unit 32.

[Processing Flow]

Figure 7:
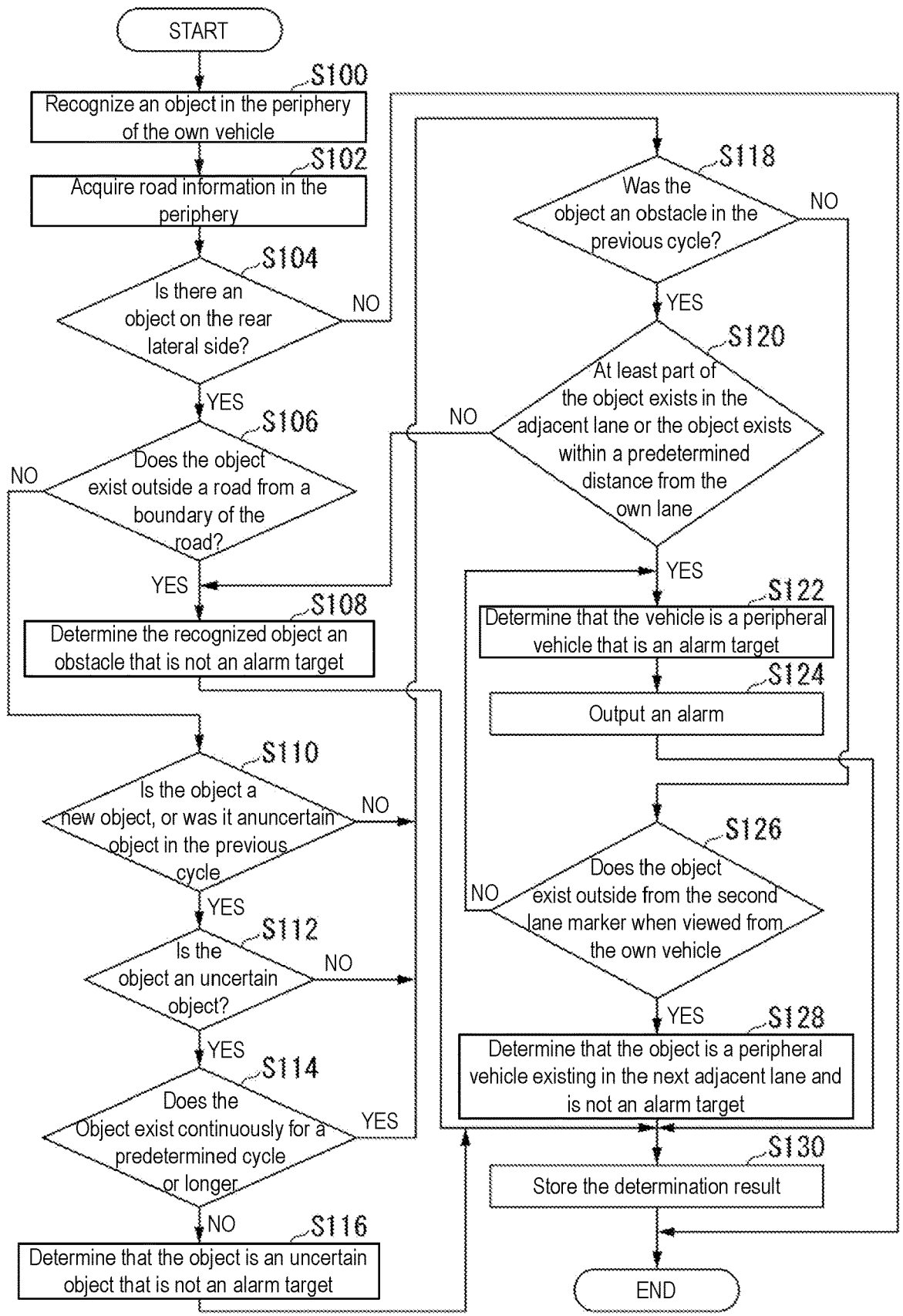
FIG. 7 is a flowchart showing an example of a processing flow executed by a vehicle control device 100 of the embodiment.

FIG. 7 is a flowchart showing an example of a processing flow executed by the vehicle control device 100 of the embodiment. For example, the processing of this flowchart may be repeatedly executed at a predetermined cycle or a predetermined timing. First, the object recognition unit 110 recognizes an object in the periphery of the own vehicle M (step S100). Next, the road information acquisition unit 120 acquires road information in the periphery of the own vehicle M (step S102).

Next, the determination unit 130 determines whether or not there is an object on the rear lateral side (an example of a predetermined region set with reference to the own vehicle M) of the own vehicle M (step S104). When it is determined that there is an object on the rear lateral side, the determination unit 130 performs the following processing for each object. As the first determination process, the determination unit 130 determines whether or not the object recognized by the object recognition unit 110 is an obstacle (step S106). When it is determined that the object is an obstacle, the determination unit 130 determines that the recognized object is an obstacle and is not an alarm target (step S108).

Further, when it is determined in the process of step S106 that the recognized object is not an obstacle, in the second determination process, the determination unit 130 determines whether or not the object recognized by the object recognition unit 110 is a new object, or whether or not it was an uncertain object in the previous cycle (whether or not the object recognized by the object recognition unit 110 in the previous cycle was determined as an uncertain object) (step S110). When it is determined that the object is a new object or it was an uncertain object in the previous cycle, the determination unit 130 determines whether or not it is an uncertain object in the current determination this time (step S112).

Further, when it is determined that it is an uncertain object in the current determination, the determination unit 130 determines whether or not the same uncertain object exists continuously for a predetermined cycle or longer (step S114). When it is determined that the object does not exist continuously for a predetermined cycle or longer, the determination unit 130 determines that the object is an uncertain object that is not an alarm target (step S116). Moreover, when it is determined that the object exists continuously for a predetermined cycle or longer, when it is determined that the object is not a new object and it was not an uncertain object in previous cycle in the process of step S110, or when it is determined that the object is not an uncertain object in the process of step S112, in the third determination process, the determination unit 130 determines whether or not the object was determined as an obstacle in the previous cycle (step S118). When it is determined that the object was determined to be an obstacle in the previous cycle, in the fourth determination process, the determination unit 130 determines whether or not at least part of the object exists in the adjacent lane or the object exists within a predetermined distance from the own lane (step S120). When it is determined that none of the part of the object exists in the adjacent lane and the object does not exist within a predetermined distance from the own lane, the determination unit 130 determines that the object is an obstacle that is not an alarm target (step S108). When it is determined that at least part of the object exists in the adjacent lane or the object exists within a predetermined distance from the own lane, the determination unit 130 determines that the vehicle is a peripheral vehicle that is an alarm target (step S122). Then, the alarm control unit 142 causes the HMI 30 to output an alarm regarding the object (step S124).

Further, in the process of step S118, when it is determined that the object was determined as not an obstacle in the previous cycle, in the fifth determination process, the determination unit 130 determines whether or not the object exists outside from the second lane marker when viewed from the own vehicle (step S126). When it is determined that the object does not exist outside from the second lane marker when viewed from the own vehicle, it is determined that the object is a peripheral vehicle that is an alarm target (step S122). Then, the alarm control unit 142 causes the HMI 30 to output an alarm for the object (step S124). Further, in the process of step S126, when it is determined that the object exists outside from the second lane marker when viewed from the own vehicle, the determination unit 130 determines that the object is a peripheral vehicle existing in the next adjacent lane and is not an alarm target (step S128).

Further, the determination unit 130 stores the determination result for one cycle in the storage unit 150 after the processing of step S108, step S124, step S128, or step S116 (step S130). This completes the processing of this flowchart. If it is determined in the process of step S104 that no object exists on the rear lateral side of the own vehicle M, the process of this flowchart ends.

Modification Example

Here, a modified example of the vehicle control device 100 of the above-described embodiment will be described. For example, among the objects existing in the periphery of the own vehicle M, the object recognition unit 110 recognizes the relative position and relative speed relative to the own vehicle M in time series, and recognizes an object (peripheral vehicle) approaching the own vehicle M based on the recognition result. Then, in addition to (or instead of) the first to fifth determination processes described above, the determination unit 130 may determine an object approaching the own vehicle M to be a vehicle that is an alarm target. As a result, it is possible to more appropriately notify the occupant of the existence of a peripheral vehicle that is likely to come into contact with the own vehicle M.

Further, in the embodiment, when the BSI is output from the HMI 30, instead of (or in addition to) displaying the image 36a by the BSI indicator 36, an image showing the position where the alarm target object exists (relative position as seen from the own vehicle M) may be generated and displayed on the display unit 32. In this case, the alarm control unit 142 generates an image imitating the own vehicle M and an image imitating the alarm target object (peripheral vehicle), and positions the alarm target object at a position corresponding to the direction in which the object exists and the relative position based on the image imitating the own vehicle M, and displays each image on the display unit 32. As a result, even if there are multiple vehicles that are alarm targets, the occupant can more clearly grasp their positions.

Further, in the embodiment, for example, the determination unit 130 may estimates the road shape in the periphery of the own vehicle M from the traveling trajectory of the own vehicle M, set a predetermined region (region at rear lateral side of the own vehicle M) according to the estimated road shape, and determines the alarm target object by the determination process described above based on the set predetermined region. As a result, the alarm control can be activated more appropriately for a vehicle approaching from behind even in a road shape such as a sharp curve. Moreover, the determination unit 130 may perform the above-mentioned road shape estimation when the road information in the periphery of the own vehicle M cannot be acquired from the map information or the camera image. As a result, even when the road information in the periphery of the own vehicle M cannot be acquired from the map information or the camera image, the object that are not target alarm objects can be excluded.

According to the vehicle control device 100 of the embodiment described above, the object recognition unit (an example of a recognition unit) 110 that recognizes an object in the periphery of the own vehicle M, the road information acquisition unit 120 that acquires road information in the periphery of the own vehicle M, and the alarm control unit 142 that causes an alarm device to give an alarm when there is an object recognized by the object recognition unit 110 in a predetermined region set with reference to the position of the own vehicle M are provided, and when at least part of the object existing in the predetermined region recognized by the object recognition unit 110 exists outside the road from the boundary of the road where the own vehicle acquired by the road information acquisition unit 120 exists, by not giving an alarm regarding the object, the alarm control unit 142 can more appropriately give an alarm regarding an object to the occupant of the own vehicle.

Specifically, according to the embodiment, by using road information (for example, information such as boundaries and lane markers), obstacles other than traveling vehicles can be detected and excluded from being alarm targets, such that the alarm accuracy can be improved. Further, according to the embodiment, when at least part of the object exists in the adjacent lane, the alarm accuracy can be further improved because the obstacle outside the road and the vehicle in the next adjacent lane can be excluded from being the alarm target. Moreover, according to the embodiment, by making an object existing within a predetermined distance from the own lane as an alarm target, even when the lane on the road cannot be recognized, the alarm accuracy can be further improved by making a determination based on the lane marker information and the detection distance of the object. Therefore, according to the embodiment, the road information can be used to provide a more appropriate BSI.

[Hardware Configuration]

Figure 8:
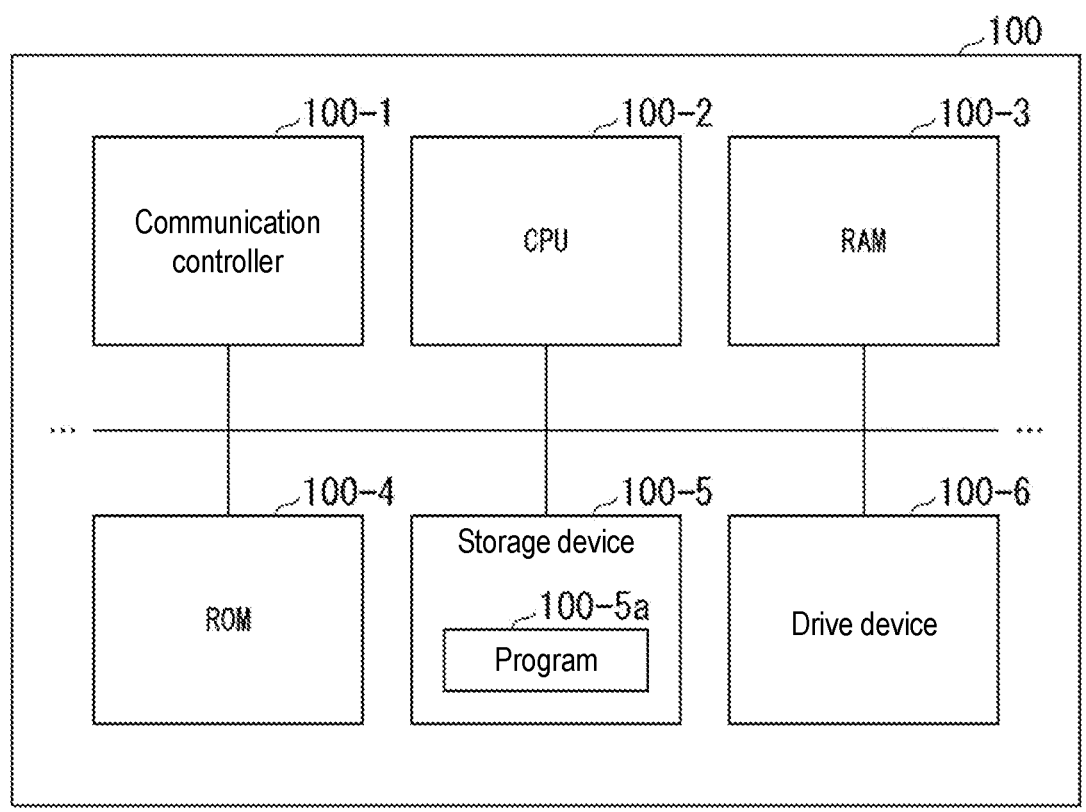
FIG. 8 is a diagram showing an example of a hardware configuration of the vehicle control device 100 of the embodiment.

FIG. 8 is a diagram showing an example of a hardware configuration of the vehicle control device 100. As shown, the vehicle control device 100 has a configuration in which a communication controller 100-1, a CPU 100-2, a RAM 100-3 configured as a working memory, a ROM 100-4 for storing a boot program, a storage device 100-5 such as a flash memory and an HDD, and a drive device 100-6 and the like are connected to each other by an internal bus or a dedicated communication line. The communication controller 100-1 communicates with a component other than the vehicle control device 100. A portable storage medium such as an optical disk (for example, a computer-readable non-temporary storage medium) is mounted on the drive device 100-6. The storage device 100-5 stores a program 100-5a executed by the CPU 100-2. This program is loaded to the RAM 100-3 by a DMA (Direct Memory Access) controller (not shown) or the like, and is executed by CPU 100-2. The program 100-5a referenced by the CPU 100-2 may be stored in a portable storage medium mounted on the drive device 100-6, or may be downloaded from another device via a network. Thereby, a part or all of each component of the vehicle control device 100 is realized.

The embodiment described above can be expressed as follows.

A vehicle control device including:
a storage device that stores a program, and
a hardware processor, to
recognize an object in a periphery of an own vehicle,
acquire road information in the periphery of the own vehicle,
cause an alarm device to give an alarm when the object recognized exists in a predetermined region set with reference to a position of the own vehicle, and
not cause the alarm regarding the object when at least part of the object existing in the predetermined region exists outside a road from a boundary of the road where the own vehicle exists,
by executing the hardware processor the program stored in the storage device.

(2): In the aspect of (1), the road information acquisition unit acquires an own lane on which the own vehicle travels and included in the road, and an adjacent lane adjacent to the own lane, and the alarm control unit gives the alarm when at least part of the object existing in the predetermined region recognized by the recognition unit exists in the adjacent lane acquired by the road information acquisition unit.

(3): In the aspect (1) or (2), the alarm control unit gives the alarm when the object existing in the predetermined region recognized by the recognition unit exists within a predetermined distance from a lane marker of the own lane on which the own vehicle travels and included in the road acquired by the road information acquisition unit.

(4): In any one of the (1) to (3), the recognition unit recognizes, among objects in the periphery of the own vehicle, as an uncertain object an object having a recognition reliability equal to or less than a threshold value or an object whose first recognized position is within a predetermined distance from the own vehicle; and the alarm control unit does not give the alarm regarding the object when the object existing in the predetermined region and inside the road from the boundary of the road where the own vehicle exists is an uncertain object that has not been recognized continuously for a predetermined time or longer.

(5): In any one of the (1) to (4), the recognition unit recognizes the object as an obstacle when at least part of the object existing in the predetermined region exists outside the road from the boundary of the road where the own vehicle exists, and the alarm control unit gives the alarm regarding the object when at least part of the object recognized as an obstacle in a previous cycle exists in an adjacent lane or the object exists within a predetermined distance from the own lane.

(6): In the aspect of (5), the alarm control unit does not give the alarm regarding the object when an object that is not recognized as an obstacle in a previous cycle exists outside a second lane marker when viewed from the own vehicle.

According to the aspects (1) to (8), it is possible to more appropriately give an alarm regarding an object to an occupant of an own vehicle.

Although the embodiments for carrying out the disclosure have been described above using the embodiments, the disclosure is not limited to these embodiments, and various modifications and substitutions may be added without departing from the gist of the disclosure.

What is claimed is:

1. A vehicle control device, comprising:
   a processor, configured to:
      recognize an object in the periphery of an own vehicle;
      acquire road information in the periphery of the own vehicle;
      cause an alarm device to give an alarm when the object exists in a predetermined region set with reference to a position of the own vehicle, wherein the predetermined region is a rear region of the own vehicle; and
      not cause the alarm device to give the alarm regarding the object when at least part of the object existing in the predetermined region exists outside a road from a boundary of the road where the own vehicle exists, wherein the boundary of the road is a mark other than a lane marker.

2. The vehicle control device according to claim 1, wherein
   the processor acquires an own lane on which the own vehicle travels and included in the road, and an adjacent lane adjacent to the own lane, and
   the processor causes the alarm device to give the alarm when at least part of the object existing in the predetermined region exists in the adjacent lane.

3. The vehicle control device according to claim 1, wherein
   the processor causes the alarm device to give the alarm when the object existing in the predetermined region exists within a predetermined distance from a first lane marker of the own lane on which the own vehicle travels and included in the road.

4. The vehicle control device according to claim 2, wherein
   the processor causes the alarm device to give the alarm when the object existing in the predetermined region exists within a predetermined distance from a first lane marker of the own lane on which the own vehicle travels and included in the road.

5. The vehicle control device according to claim 1, wherein
   the processor recognizes, among objects in the periphery of the own vehicle, an object having a recognition reliability equal to or less than a threshold value or an object whose first recognized position is within a predetermined distance from the own vehicle as an uncertain object, and
   the processor does not cause the alarm device to give the alarm regarding the object when the object existing in the predetermined region and inside the road from the boundary of the road where the own vehicle exists is an uncertain object that has not been recognized continuously for a predetermined time or longer.

6. The vehicle control device according to claim 2, wherein
   the processor recognizes, among objects in the periphery of the own vehicle, an object having a recognition reliability equal to or less than a threshold value or an object whose first recognized position is within a predetermined distance from the own vehicle as an uncertain object, and
   the processor does not cause the alarm device to give the alarm regarding the object when the object existing in the predetermined region and inside the road from the boundary of the road where the own vehicle exists is an uncertain object that has not been recognized continuously for a predetermined time or longer.

7. The vehicle control device according to claim 1, wherein
   the processor recognizes the object as an obstacle when at least part of the object existing in the predetermined region exists outside the road from the boundary of the road where the own vehicle exists, and
   the processor causes the alarm device to give the alarm regarding the object when at least part of the object recognized as an obstacle in a previous cycle exists in an adjacent lane or the object exists within a predetermined distance from the own lane.

8. The vehicle control device according to claim 2, wherein
   the processor recognizes the object as an obstacle when at least part of the object existing in the predetermined region exists outside the road from the boundary of the road where the own vehicle exists, and
   the processor causes the alarm device to give the alarm regarding the object when at least part of the object recognized as an obstacle in a previous cycle exists in an adjacent lane or the object exists within a predetermined distance from the own lane.

9. The vehicle control device according to claim 7, wherein
   the processor does not cause the alarm device to give the alarm regarding the object when an object that is not recognized as an obstacle in a previous cycle exists outside a second lane marker when viewed from the own vehicle.

10. The vehicle control device according to claim 8, wherein
   the processor does not cause the alarm device to give the alarm regarding the object when an object that is not recognized as an obstacle in a previous cycle exists outside a second lane marker when viewed from the own vehicle.

11. A vehicle control method, comprising:
recognizing objects in the periphery of an own vehicle;
acquiring road information in the periphery of the own vehicle;
causing an alarm device to give an alarm when the object recognized exists in a predetermined region set with reference to a position of the own vehicle, wherein the predetermined region is a rear region of the own vehicle; and
not causing the ala in device to give the alarm regarding the object when at least part of the object existing in the predetermined region exists outside a road from a boundary of the road where the own vehicle exists, wherein the boundary of the road is a mark other than a lane marker.

12. A non-transitory recording medium, storing a program,
causing a computer to
recognize objects in the periphery of an own vehicle,
acquire road information in the periphery of the own vehicle,
cause an alarm device to give an alarm when the object recognized exists in a predetermined region set with reference to a position of the own vehicle, wherein the predetermined region is a rear region of the own vehicle, and
not cause the alarm device to give the alarm regarding the object when at least part of the object existing in the predetermined region exists outside a road from a boundary of the road where the own vehicle exists, wherein the boundary of the road is a mark other than a lane marker.

* * * * *